(12) United States Patent
Govorkov et al.

(10) Patent No.: US 6,970,492 B2
(45) Date of Patent: Nov. 29, 2005

(54) DUV AND VUV LASER WITH ON-LINE PULSE ENERGY MONITOR

(75) Inventors: Sergei V. Govorkov, Boca Raton, FL (US); Gongxue Hua, Coral Springs, FL (US)

(73) Assignee: Lambda Physik AG, Goettingen (DE)

( * ) Notice: Subject to any disclaimer, the term of this patent is extended or adjusted under 35 U.S.C. 154(b) by 57 days.

(21) Appl. No.: 10/438,240

(22) Filed: May 14, 2003

(65) Prior Publication Data

US 2003/0219057 A1    Nov. 27, 2003

Related U.S. Application Data

(60) Provisional application No. 60/381,586, filed on May 17, 2002.

(51) Int. Cl.[7] .............................. H01S 3/22; H01S 3/08
(52) U.S. Cl. ............................ 372/55; 372/57; 372/60; 372/101; 372/103; 372/108
(58) Field of Search .............................. 372/55, 57, 60, 372/61, 86, 87, 90, 101, 103, 108

(56) References Cited

U.S. PATENT DOCUMENTS

| | | | |
|---|---|---|---|
| 3,975,098 A | 8/1976 | West | 356/318 |
| 5,051,162 A | 9/1991 | Kambara et al. | 204/612 |
| 5,054,878 A | 10/1991 | Gergely et al. | 385/33 |
| 5,062,942 A | 11/1991 | Kambara et al. | 204/612 |
| 5,194,913 A | 3/1993 | Myrick et al. | 356/301 |
| 5,290,419 A | 3/1994 | Kambara et al. | 204/612 |
| 5,307,148 A | 4/1994 | Kambara et al. | 356/344 |
| 5,424,841 A | 6/1995 | Van Gelder et al. | 356/417 |
| 5,485,269 A | 1/1996 | Feldman | 356/318 |
| 5,516,692 A | 5/1996 | Berndt | 435/286.7 |
| 5,830,138 A | 11/1998 | Wilson | 600/327 |
| 5,894,352 A | 4/1999 | Morton | 356/432 |
| 5,926,271 A | 7/1999 | Couderc et al. | 356/318 |
| 6,002,137 A | 12/1999 | Hayashi | 250/458.1 |
| 6,058,739 A | 5/2000 | Morton et al. | 65/30.1 |
| 6,067,306 A | 5/2000 | Sandstrom et al. | 372/38 |
| 6,075,611 A | 6/2000 | Dussan V. et al. | 356/432 |
| 6,141,081 A | 10/2000 | Das et al. | 355/53 |
| 6,144,448 A | 11/2000 | Mitoma | 356/317 |
| 6,191,425 B1 | 2/2001 | Imai | 250/458.1 |
| 6,327,284 B1 | 12/2001 | Stamm et al. | 372/32 |
| 6,363,094 B1 | 3/2002 | Morton et al. | 372/59 |
| 6,389,045 B1 | 5/2002 | Mann et al. | 372/25 |
| 6,486,949 B2 * | 11/2002 | Hachfeld et al. | 356/318 |
| 6,529,533 B1 | 3/2003 | Voss | 372/29.01 |
| 6,542,243 B2 | 4/2003 | Kramer | 356/450 |

(Continued)

OTHER PUBLICATIONS

E.M. Guillikson et al., "Stable silicon photodiodes for absolute intensity measurements in the VUV and soft x-ray regions," *Journal of Electron Spectroscopy and Related Phenomena*, vol. 80 (1996), pp. 313-316.

(Continued)

*Primary Examiner*—Minsun Oh Harvey
*Assistant Examiner*—Armando Rodriguez
(74) *Attorney, Agent, or Firm*—Stallman & Pollock LLP

(57) ABSTRACT

A beam parameter monitoring unit for coupling with an excimer or molecular fluorine ($F_2$) laser resonator that produces an output beam having a wavelength below 200 nm includes an on-line laser pulse energy detector. This, in turn, allows output pulse energy stabilization to the same degree of accuracy, which is crucial for stability of exposure dose and other process parameters in microlithography and industrial applications.

21 Claims, 4 Drawing Sheets

U.S. PATENT DOCUMENTS

| | | | |
|---|---|---|---|
| 6,549,555 B2 * | 4/2003 | Serwazi et al. | 372/59 |
| 6,587,202 B2 | 7/2003 | Rebhan | 356/432 |
| 6,665,072 B2 | 12/2003 | Hoyt | 356/417 |
| 6,704,109 B2 | 3/2004 | Wu et al. | 356/417 |
| 6,839,375 B1 * | 1/2005 | Lokai et al. | 372/92 |
| 2002/0021730 A1 | 2/2002 | Schroeder et al. | 372/57 |
| 2002/0139936 A1 | 10/2002 | Dumas | 250/458.1 |
| 2002/0159064 A1 | 10/2002 | Wakabayashi et al. | 356/402 |

OTHER PUBLICATIONS

N. Leclerc et al., "Transient absorption and fluorescence spectroscopy in fused silica induced by pulsed KrF excimer laser irradiation," *Appl. Phys. Lett.*, vol. 59, No. 26, Dec. 23, 1991, pp. 3369-3371.

In re application of Vogler, U.S. Appl. No. 09/512,417 filed Feb. 24, 2000, entitled "Energy Monitor for F2 Molecular Fluorine Laser and Method of Energy Stabilization", 17 pages.

In re application of Voger et al., U.S. Appl. No. 09/771,013 filed Jan. 25, 2001, entitled "Energy Monitor for Molecular Fluorine Laser", 56 pages.

K. Solt et al., "PtSi-n-Si Schottky-barrier photodetectors with stable spectral responsivity in the 120-250 nm spectral range", Appl. Phys. Lett 69, Dec. 1996, pp. 3662-3664.

P.S. Shaw et al., "Ultraviolet radiometry with synchrotron radiation and cryogenic radiometry", Applied Optics, vol. 38, No. 1, Jan. 1, 1999, pp. 18-28.

P.S. Shaw et al., "New ultraviolet radiometry beamline at the Synchrotron Ultraviolet Radiation Facility at NIST", Metrologia, 1998, 35, pp. 301-306.

Kuschnerus, et al., "Characterization of photodiodes as transfer detector standards in the 120 nm to 600 nm spectral range", Metrologia, 1998, 35, pp. 355-362.

International Radiation Detectors Inc. Datasheet, "SXUV Series Photodiodes", Sep. 1999 , www.ird-inc.com.

R. Korde et al., "One Gigarad Passivating Nitrided Oxides for 100% Internal Quantum Efficiency Silicon Photodiodes", IEEE Transactions on Nuclear Science, vol. 40, No. 6, Dec. 1993, pp. 1655-1659.

L.R. Canfield, et al., "Absolute silicon photodiodes for 160 nm to 254 nm photons", Metrologia, 1998, 35, pp. 329-334.

* cited by examiner

Fluorescence Spectrum of $BaF_2$

Temperature Dependence of Slow and Fast Components of Fluorescence Components of $BaF_2$

DUV AND VUV LASER WITH ON-LINE PULSE ENERGY MONITOR

PRIORITY

This application claims the benefit of priority to U.S. provisional patent application No. 60/381,586, filed May 17, 2002.

BACKGROUND OF THE INVENTION

1. Field of the Invention

The invention relates to an energy monitoring device, and particularly for monitoring the energy of an excimer or molecular fluorine laser emitting below 200 nm.

2. Discussion of the Related Art

In the past, i.e., prior to the investigations leading up to the present application, very little was known about the behavior of UV-photodetectors under long-term laser pulse radiation exposure below 200 nm. Only a limited number of CW synchrotron exposure experiments had been done at Physikalisch-Technische Bundesanstalt, Berlin (PTB) and the National Institute of Standards and Technology (NIST).

Until now, no reliable energy monitor for detecting the pulse energy of e.g. a molecular fluorine (F2) laser emitting around 157 nm has been available.

For detecting 193 nm and 248 nm excimer laser radiation, UV-photodetectors such as the International Radiation Detectors, Inc. (IRD) UVG 100 or the Hamamatsu S 5226, or S1226 have been used typically as energy monitor detectors. However, these detectors strongly degrade under 157 nm laser exposure.

It is therefore desired to have a reliable photodetector for monitoring pulse energies and/or another parameter of an excimer or molecular fluorine laser beam.

SUMMARY OF THE INVENTION

An embodiment herein provides a beam parameter monitoring unit for coupling with an excimer or molecular fluorine (F2) laser resonator that produces an output beam having a wavelength of below 200 nm is provided.

INCORPORATION BY REFERENCE

Figure 1:
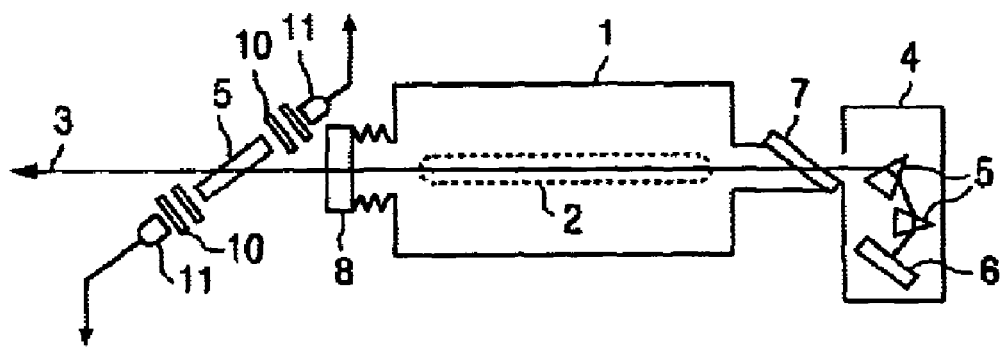
FIG. 1 shows a first embodiment of a beam monitoring unit.

What follows is a cite list of references each of which is, in addition to those references cited above and below herein, including that which is described as background, and the above invention summary, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the detailed description of the preferred embodiment with the same effect as just described with respect to the following references:

K. Solt, et al., PtSi-n-Si Schottky-barrier photodetctors with stable spectral responsitivity in the 120–250 nm spectral range, Appl. Phys. Lett 69, 3662 (1996);

P. S. Shaw, et al. Ultraviolet radiometry with synchrotron radiation and cryogenic radiometry, Appl. Optics 38, 18 (1999);

P. S. Shaw, et al., New ultraviolet radiometry beamline at the Synchrotron Ultraviolet Facility at NIST, Metrologia 35, 301 (1998);

P. Kuschnerus, et al., Characterization of photodiodes as transfer detector standards in the 120 nm to 600 nm spectral range, Metrologla 35, 355 (1998);

IRD datasheet, SXUV Series Photodiodes, September 1999 (www.ird-inc.com);

R. Korde, et al., One Gigarad passivating Nitride Oxide for 100% Internal Quantum Efficiency Silicon Photodiodes, IEEE Transactions on Nuclear Science 40, 1655 (1993);

L. R. Canfield, et al., Absolute Silicon photodiodes for 160 nm to 254 nm Photons Metrologia 35, 329 (1998);

R. Korde, et al., Stable silicon photodiodes with platinium Silicide front window for the ultraviolet, presented at the VUV-XII conference; and United States patent applications and patent Nos. 09/512,417, 09/594,892, 10/116,903, 09/718,809, 60/170,919, 09/738,849, 09/588,561, 6,463,084, 6,487,229, 6,490,305, 6,219,368, 6,399,916, 6,477,192, 6,154,470 and 6,556,613, each application of which is assigned to the same assignee as the present application.

DETAILED DESCRIPTION OF THE PREFERRED EMBODIMENTS

The invention provides a detector for monitoring an output beam parameter of an excimer or molecular fluorine gas discharge laser operating below 200 nm. It is recognized that energy monitors are known for use with ArF and KrF excimer lasers emitting around 193 nm and 248 nm, respectively. However, these energy monitors are generally not useable for detecting 157 nm laser radiation. First, these previously used UV-detectors strongly degrade when used to detect a molecular fluorine laser beam, owing to the high photon energies associated with their 157 nm (7.9 eV) emission radiation. Second, any 157 nm energy monitor will use a special design, because of a very high sensitivity to residual absorption by gaseous species such as oxygen, water vapor and hydrocarbons at this wavelength, and due to contamination and degradation of optical components. This special design requires sophisticated purge and beam delivery conditions to prevent degradation of the energy monitor during long term usage for detecting 157 nm radiation.

In one conventional silicon detector, one of the intrinsic degradation mechanisms is related to radiation-induced defects in the interface layer between silicone dioxide film at the surface and crystalline silicon forming p-n junction. Such defects serve as "traps" for photo-electrons thus reducing sensitivity of the detector. The silicon dioxide layer can be replaced by some proprietary materials that are more stable under UV irradiation. This, for example, is the concept utilized in some detectors manufactured by International Radiation Detectors, Inc. (Torrance, Calif.).

Figure 2:
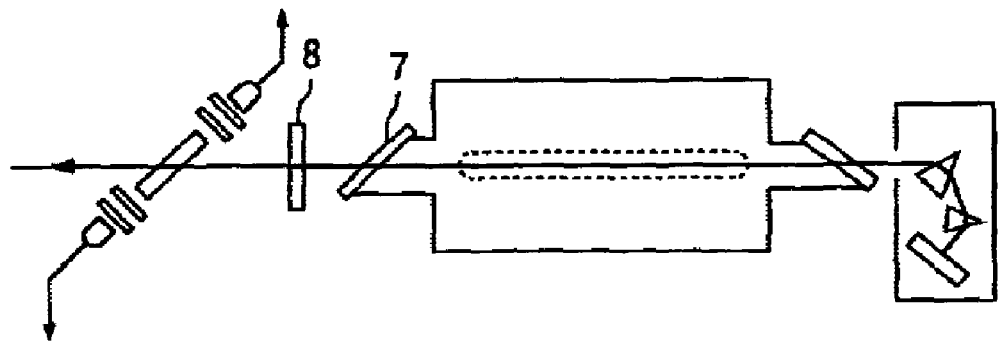
FIG. 2 shows a second embodiment of a beam monitoring unit.
Figure 3:
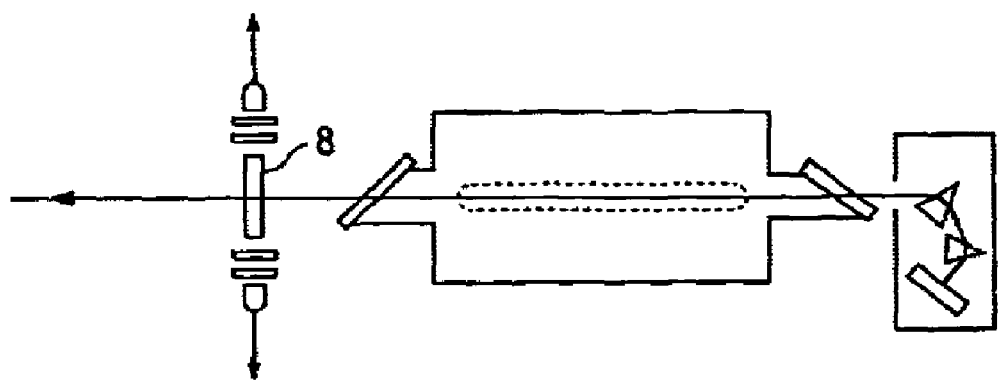
FIG. 3 shows a third embodiment of a beam monitoring unit.

Another possible improvement is the use of back-thinned detectors (example: Hamamatsu Corp. (Bridgewater, N.J.)), where the radiation reaches photo-sensitive area through the thin layer of silicon underlying the p-n junction. Other detectors utilize effect of fluorescence of certain materials under UV irradiation (examples: Laser Laboratorium Göttingen (Göttingen, Germany), Star Tech Instruments (Danbury, Conn.). Here, the fluorescence lies in the visible or near-IR part of the spectrum and can be detected by a conventional detector without danger of long-term degradation due to the short wavelength. In any of these devices, some small portion of the output laser beam has to be split off ("sampled") and directed onto the detector. Very frequently available beam sampling techniques produce excessive amounts of the sampled energy, thus requiring further attenuation of the sampled beam, commonly by using diffusers and/or metallic meshes. Common beam sampling techniques include reflective beam splitters which utilize Fresnel reflection of the un-coated optical windows. Less commonly, diffractive beam samplers are used, which are essentially transmissive diffraction gratings with reduced diffraction efficiency. Besides the degradation of the detectors, the inherent problem with these existing techniques, that is specific to the DUV and VUV spectral ranges, is their sensitivity to contamination by organic substances, moisture and oxygen. These chemicals are commonly present in the atmosphere and on the optical surfaces. Even when the beam path is enclosed in an inert-gas purged housing, there is a certain amount of impurities present. Laser radiation tends to 1) Remove some of the contaminants (which is known as "Laser cleaning"), or, sometimes, 2) Cause photochemical reactions leading to production of light-absorbing gases (ozone, nitrogen oxides), or polymer films on the exposed surfaces. These effects tend to modify, the reflectivity of beam samplers, and also change transmittance of the beam attenuating components as well. As a result, even assuming perfectly stable detector, the calibration coefficient of the power monitor varies as a function of such factors as gas purging rate and purity, temperature, exposure time and others. The present invention overcomes this limitation by 1) Eliminating the need to rely on properties of optical surfaces for sampling the beam
2) Using fluorescent material as a wavelength converter Three main preferred embodiments are shown in FIGS. 1–3. In order to solve problems the pulse energy monitor in FIG. 1 is inserted directly into the output beam, instead of the sampled and attenuated beam. The optical window 9 is made of fluorescent (but still transparent) material and is inserted into the output beam. Since in majority of line-narrowed or line-selected lasers the output beam is linearly polarized, the window should be preferably at the Brewster angle to the beam. There are preferably several photo-detectors 11 arranged near the window 9, so as to detect fluorescent emission. Such emission results from the main output beam being slightly absorbed in the window 9. Each of photo-detectors 11 has one or more spectral filters 10 in front of it, in order to select appropriate spectral component of the fluorescent emission, as discussed below. The line narrowing module 4 consists of prisms 5 and grating 6.

This setup is relatively in-sensitive to the contamination and "cleaning" effects described above. Indeed, lets consider a conventional beam splitter made as a transparent window placed in the beam. Some portion R of the beam power, typically in the range of R=0.1% to 5.0%, will be reflected at each surface of such beam splitter. Modification of the surface condition due to contamination (or cleaning) will result in the change of Fresnel reflectivity by some small amount $\Delta R$. Additionally, there are possible changes in scattering and absorption (or, collectively, losses L) at the surface, due to the impurities and surface roughness. The relative variation of the sampled beam power at the detector, therefore, will be $(\Delta R-\Delta L)/R$. At the same time, the power variation in the detector of the present invention will be $(\Delta R-\Delta L)/(1-R)$. Since R, $\Delta R$ and $\Delta L$ are small values, relative change of the signal in the present invention is negligible, while in the conventional technique it may be substantial. This is the main principle of present invention.

Examples of materials suitable for the window 9 include, among others, CaF2, BaF2, MgF2, sapphire, LiSrAlF6 (commonly known as LiSAF), LiCaAlF6 (commonly known as LiCAF), high purity crystalline quartz, OH-free fused silica. It is important to select proper spectral range of the fluorescence emission. Spectral filters 10 serve to select an appropriate wavelength of fluorescence emission. It is known that certain components of the fluorescence emission spectrum are sensitive to the temperature. This makes them unsuitable for stable operation because temperature in the irradiated area of the window 9 may change due to 1) variations of the ambient temperature
2) local heating by the laser beam Another factor is that some spectral components of fluorescence emission have slow temporal response. This creates problems for detection of high repetition rate pulses, such as 2 kHz to 6 kHz.

Figure 4A:
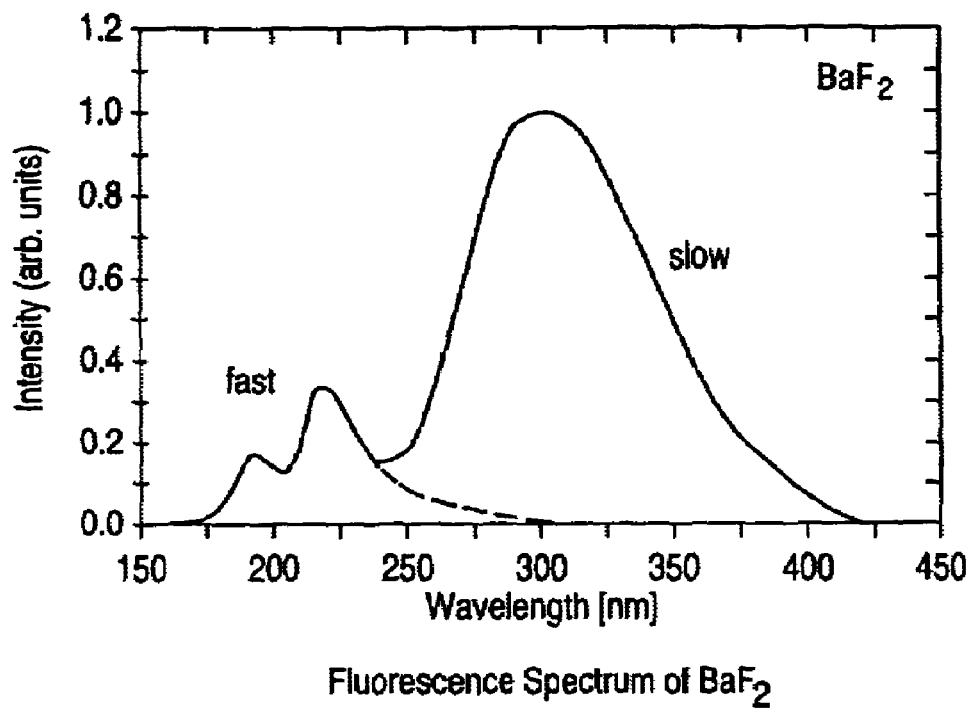
FIG. 4a shows a fluorescence spectrum of $BaF_2$.
Figure 4B:
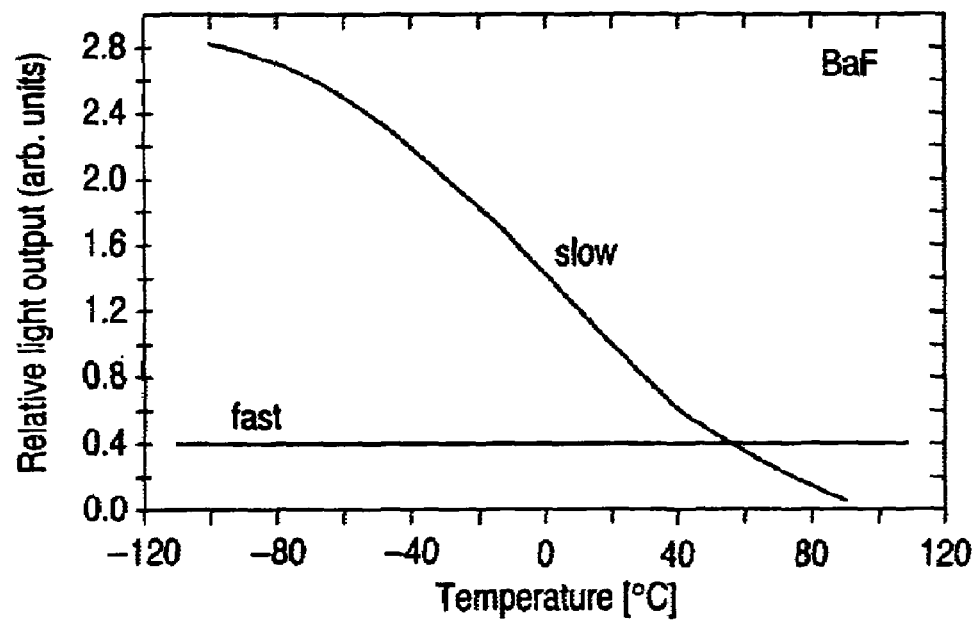
FIG. 4b shows a temperature dependence of slow and fast components of fluorescence components of $BaF_2$.

Example of the fluorescence spectrum and temperature dependence of "slow" and "fast" components of fluorescence of BaF2 is shown in FIGS. 4a and 4b. The "fast" component is present in the spectral range below 250 nm. This component's emission efficiency is almost independent on the temperature, whereas "slow" component shows intensity decrease of approximately 1.1% per K between 250 K and 325 K. The "fast" component can be selected by using spectral filters, such as color-glass filters, or thin-film low-pass or interference filters.

Another example is the fluorescence emission of sapphire. There is an emission from chromium atom impurity in sapphire. Its double-line feature centered at approximately 694 nm has a total spectral width of several nanometers. This spectral line has radiative lifetime of approximately 3 ms, which limits repetition rate to roughly 300 Hz. Another emission band centered at 800 nm stretches from approximately 600 nm to 1100 nm and is caused by Ti atom impurity in sapphire. Its fluorescence lifetime is 3.2 microseconds, which is suited for high repetition rate detection.

An additional advantage of using spectral filters is that it eliminates stray emission generated in plasma discharge in the laser chamber, and also "red line" emission in molecular fluorine laser (located between 740 nm and 800 nm).

Further possible fluorescent materials are LiSAF and LiCAF with small amount of Cr impurity. This impurity produces emission in the range 700 to 1100 nm.

All of the mentioned above materials either naturally contain small amounts of fluorescent impurities, or such impurities can be introduced in controllable amounts during manufacturing. It is also important to ensure highest possible transparency of these materials at the laser wavelength, which usually means minimizing such impurities as OH radicals. This is a common knowledge in the industry that produces DUV or VUV-grade optical materials.

The example of appropriately selected spectral detection window is using a long-pass spectral filter 10 (part number LPF-800 from CVI Laser Corp. (Albuquerque, N. Mex.) with the DUV-grade sapphire window 9 manufactured by Crystal Systems Inc. (Salem, Mass.). Here, the emission from Ti-impurity is detected, "red-line" emission from molecular fluorine laser is blocked, and overall stability of +1% over the 50 million pulses-run is typical.

The 0.5 mm-thick sapphire window has transmission for linearly polarized beam of approximately 95% when placed in the beam at the Brewster angle.

The window 9 is placed in the output laser beam at the Brewster angle, so that to minimize reflective losses at the surfaces. This further reduces influence of the changes in reflectivity on the overall sensitivity of the monitor.

An additional possible embodiment shown in FIG. 2 includes additional Brewster window 7 sealing the laser chamber, as described in the prior art sources.

Another embodiment shown in FIG. 3 combines functions of the outcoupler 8 and a fluorescent window 9 in one element. This reduces the total number of optical elements, and, therefore, overall losses of the beam power due to residual reflection, scatter and absorption at the surfaces of window 9.

Figure 5A:
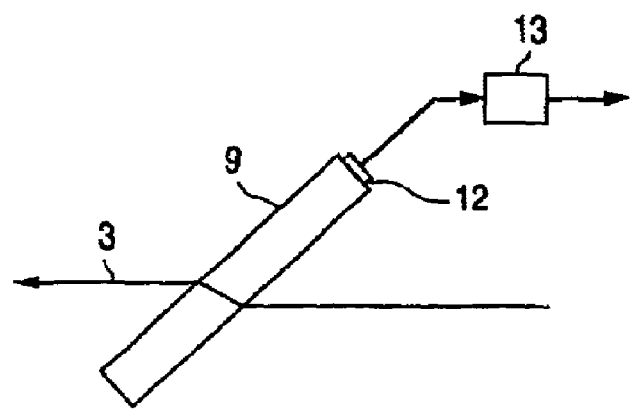
FIG. 5a shows an acousto-optical detection technique.
Figure 5B:
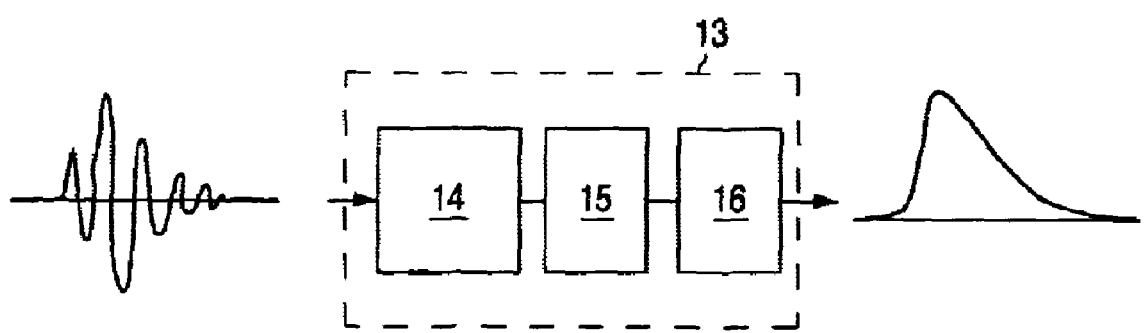
FIG. 5b shows an electric signal from the piezoelectric microphone.

Yet another possible way of measuring the amount of laser power absorbed by the window 9 is using the Acousto-Optical (AO) detection technique. The AO detection method is based on the fact that absorption of the short laser pulse leads to local heating, subsequent thermal expansion and formation of the acoustic wave in the window 9. The acoustic detector 12 in FIG. 5a (which can be a piezo-electric microphone) detects this acoustic wave and converts it into an electrical signal. The amplitude of the acoustic wave is proportional to the amount of the absorbed energy of the pulse. FIG. 5b shows typically the electric signal from the piezoelectric microphone is a series of oscillation bursts, each one is at the resonant frequency of the window 9. The detection electronic circuit 13 may consist of a frequency filter 14 tuned to the resonant frequency of the window 9, followed by the rectifier 15 and integrator 16. The output waveform of the circuit 13 is a pulse with the fall time determined by the integrator's time constant, and the amplitude proportional to the amplitude of the input waveform. The AO-embodiment shown in FIG. 5 can be incorporated into the laser similarly to the fluorescence-based detector as shown in FIGS. 1–3. This means that the window 9 can still act either as an additional optical component in the beam path (FIGS. 1, 2), or as an outcoupler (FIG. 3).

Figure 6:
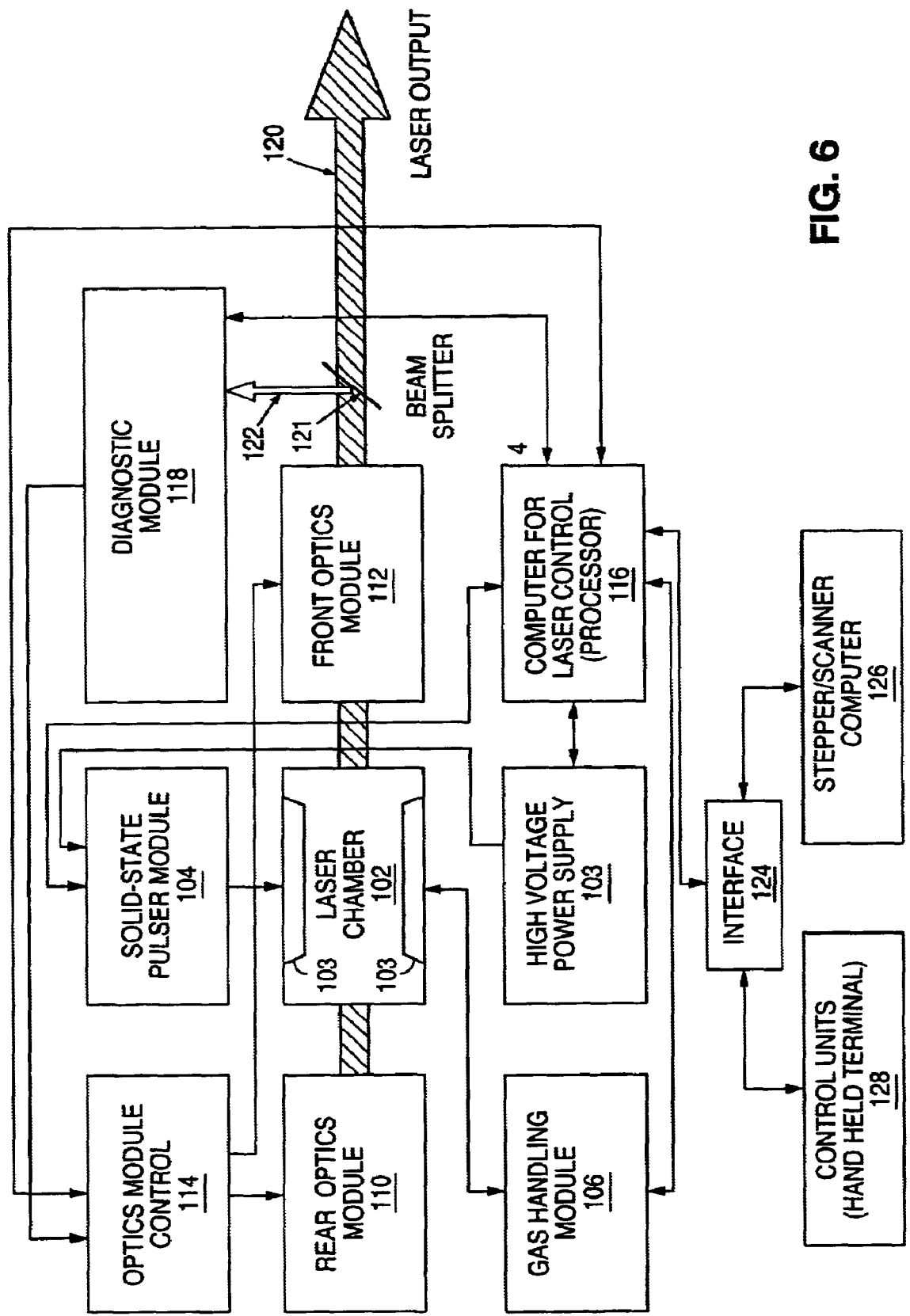
FIG. 6 shows a laser system.

FIG. 6 shows a molecular fluorine laser system in accord with a preferred embodiment. The system includes a laser chamber 102 filled with a gas mixture and having a pair of main electrodes 103 and one or more preionization electrodes (not shown). The electrodes 103 are connected to a solid-state pulser module 104. A gas handling module 106 is connected to the laser chamber 102. A high voltage power supply 108 is connected to the pulser module 104. A laser resonator is shown surrounding the laser chamber and including a rear optics module 110 and a front optics module 112. An optics control module 114 communicates with the rear and front optics modules 110, 112. A computer or processor 116 control various aspects of the laser system. A diagnostic module 118 receives a portion of the output beam 120 from a beam splitter 122.

The gas mixture in the laser chamber 102 typically includes about 0.1% F2 and 99.9% buffer gas. The buffer gas preferably comprises neon and may be a mixture of neon and helium (see U.S. Pat. No. 6,157,162, which is hereby incorporated by reference). A trace amount of a gas additive such as xenon, argon or krypton may be included (see U.S. patent application Ser. No. 09/513,025 and No. 60/160,126, which are each assigned to the same assignee as the present application and are hereby incorporated by reference).

The gas mixture is preferably monitored and controlled using an expert system (see U.S. Pat. No. 6,212,214, which is assigned to the same assignee, and U.S. Pat. No. 5,440,578, each of which is hereby incorporated by reference). One or more beam parameters indicative of the fluorine concentration in the gas mixture, which is subject to depletion, may be monitored, and the gas supply replenished accordingly (see U.S. patent applications and Pat. Nos. 6,490,307, 6,243,406, 6,212,214, 6,389,052 and Ser. No. 09/484,818, which are assigned to the same assignee and are hereby incorporated by reference). The diagnostic module 118 preferably includes monitoring equipment or a detector as set forth above, and which may also be positioned to receive a beam portion split off from within the laser resonator, as mentioned above (see also U.S. patent application No. 60/166,967, which is assigned to the same assignee as the present application and is hereby incorporated by reference). The processor 106 preferably receives information from the diagnostic module 118 concerning the halogen concentration in the gas mixture and initiates gas replenishment actions such as micro-halogen injections, mini and partial gas replacements, and pressure adjustments by communicating with the gas handling module 106.

Although not shown, the gas handling module 106 has a series of valves connected to gas containers external to the laser system. The gas handling module 106 may also include an internal gas supply such as a halogen and/or xenon supply or generator (see the '025 application). A gas compartment or (not shown) may be included in the gas handling module 106 for precise control of the micro halogen injections (see the '882 and '717 applications, mentioned above, and U.S. Pat. No. 5,396,514, which is assigned to the same assignee as the present application and is hereby incorporated by reference).

The wavelength and bandwidth of the output beam 120 are also preferably monitored and controlled. A preferred wavelength calibration apparatus and procedure are described at the '344 application, mentioned above, and at U.S. Pat. Nos. 6,160,832 and 4,905,243, which are hereby incorporated by reference. The monitoring equipment may be included in the diagnostic module 118 or the system may be configured to outcouple a beam portion elsewhere such as from the rear optics module, since only a small intensity beam portion is typically used for wavelength calibration (see the '832 patent). The diagnostic module 118 may be integrated with the front optics module 112, and the line-narrowing components of the resonator may be integrated in the front optics module 112, as well, such that only a HR mirror and an optional aperture are included in the rear optics module 110 (see U.S. patent application No. 60/166,967, which is assigned to the same assignee as the present application and is hereby incorporated by reference).

Preferred main electrodes 103 are described at U.S. patent application and U.S. Pat. Nos. 6,430,205, 6,466,599 and 60/184,705, which are each assigned to the same assignee as the present application and are hereby incorporated by reference. Other electrode configurations are set forth at U.S. Pat. Nos. 5,729,565 and 4,860,300, each of which is assigned to the same assignee and is hereby incorporated by reference. Preferred preionization units are set forth at U.S. patent application Ser. Nos. 09/692,265 and 09/247,887, each of which is assigned to the same assignee as the present application and is hereby incorporated by reference. The preferred solid state pulser module 104 and the high voltage power supply 108 are set forth at U.S. Pat. Nos. 6,020,723 and 6,005,880, 6,198,761 and U.S. patent application Nos. 60/149,392 and 60/204,905, each of which is assigned to the same assignee as the present application and is hereby incorporated by reference into the present application.

The resonator includes optics for line-selection and also preferably for narrowing the selected line (see U.S. Pat. No. 6,556,613, 6,154,470, 6,381,256, No. 60/170,342, 60/166, 967, 60/170,919, U.S. Pat. No. 5,761,236, No. 60/212,257, 60/212,301, 60/215,933, U.S. Pat. Nos. 6,285,701, 6,393, 037, 6,298,080, 6,477,192, 6,476,987, 6,061,382 and U.S. Pat. Nos. 5,761,236 and 5,946,337, each of which is assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, and 4,829,536, all of which are hereby incorporated by reference). Some of the line selection and/or line narrowing techniques set forth in these patents and patent applications may be used in combination with or alternative to any of the aspects of the invention set forth below.

Also particularly for the molecular fluorine laser system, an enclosure (not shown) seals the beam path of the beam 120 such as to keep the beam path free of VUV photoabsorbing species, as described above. Smaller enclosures preferably seal the beam path between the chamber 102 and the optics modules 110 and 112. Advantageously, the diagnostic components may be integrated into the front optics module 112, separate enclosure components that would otherwise be used between, e.g., a separate diagnostic module 118 and beam splitter module 122, or between the front optics module 112 and beam splitter module 122, would not be used. The preferred enclosure is described above in detail, and variations may be derived from U.S. Pat. Nos. 6,219, 368, 6,477,192, 6,219,368, 6,399,916 and No. 60/140,530, each of which is assigned to the same assignee and is hereby incorporated by reference, and alternative configurations are set forth at U.S. Pat. Nos. 5,559,584, 5,221,823, 5,763,855, 5,811,753 and 4,616,908, all of which are hereby incorporated by reference.

Those skilled in the art will appreciate that the just-disclosed preferred embodiments are subject to numerous adaptations and modifications without departing from the scope and spirit of the invention. Therefore, it is to be understood that, within the scope and spirit of the invention, the invention may be practiced other than as specifically described above. In particular, the invention is to be interpreted in accordance with the appended claims, and equivalents thereof, without limitations being read from the specification above.

What is claimed is:

1. An excimer or molecular fluorine laser system, comprising:
   a laser tube containing a gas mixture at least including a halogen-containing species and a buffer gas, and including a heat exchanger and a gas circulation fan therein;
   multiple electrodes within the laser tube connected to a pulsed electrical discharge circuit for energizing the gas mixture at a repetition rate greater than 1 kHz;
   a resonator for generating a sub-250 nm output laser beam; and
   a substantially transmissive energy monitor window in the beam path of the output laser beam, wherein the output beam is transmitted through the transmissive energy monitor window; and
   one or more detectors which monitor an output beam parameter by detecting an energy emitted from the transmissive energy monitor window in response the output beam being transmitted through the transmissive energy monitor window.

2. The system of claim 1, the energy monitor window comprising a material that fluoresces upon absorption of a portion of the incident light of the sub-250 nm output laser beam.

3. The system of claim 2, wherein the energy monitor window comprises one or more materials selected from group of materials consisting of $CaF_2$, $BaF_2$, $MgF_2$, sapphire, $LiSrAlF_6$, $LiCaAlF_6$, crystalline quartz, and at least substantially OH-free fused silica.

4. The system of claim 3, wherein the group of materials further consists of $SrF_2$ and LiF.

5. The system of claim 2, wherein the one or more photodetectors detect fluorescence intensities emanating from the energy monitor window.

6. The system of claim 5, further comprising one or more spectral filters for filtering wavelengths from the fluorescence to be incident on the one or more photodetectors.

7. The system of claim 6, the wavelengths filtered exhibiting greater thermal fluorescence variation than wavelengths not filtered by the one or more spectral filters.

8. The system of claim 7, the wavelengths filtered exhibiting faster thermal fluorescence responses than wavelengths not filtered by the one or more spectral filters.

9. The system of claim 6, the wavelengths filtered exhibiting faster thermal fluorescence responses than wavelengths not filtered by the one or more spectral filters.

10. The system of claim 6, the laser system being a molecular fluorine laser system, and the wavelengths filtered by the one or more spectral filters include a red atomic fluorine emission.

11. The system of claim 1, the resonator comprising an output coupler which seals the laser tube and output couples the output laser beam to be incident on the energy monitor window.

12. The system of claim 1, further comprising at least one Brewster window sealing the laser tube, and a partially reflecting output coupler for output coupling the output laser beam to be incident on the energy monitor window.

13. The system of claim 1, further comprising at least one Brewster window sealing the laser tube, and the energy monitor window further for output coupling the output laser beam.

14. The system of claim 1 wherein the one or more detectors are acoustic detectors.

15. An excimer or molecular fluorine laser system, comprising:
   a laser tube containing a gas mixture at least including a halogen-containing species and a buffer gas, and including a heat exchanger and a gas circulation fan therein;
   multiple electrodes within the laser tube connected to a pulsed electrical discharge circuit for energizing the gas mixture at a repetition rate greater than 1 kHz;
   a resonator for generating a sub-250 nm output laser beam; and
   a substantially transmissive energy monitor window in the beam path of the output laser beam, wherein the energy monitor window comprising a material that fluoresces upon absorption of a portion of the incident light of the sub-250 nm output laser beam;

one or more photodetectors for detecting fluorescence intensities emanating from the energy monitor window; and one or more spectral filters for filtering wavelengths from the fluorescence to be incident on the one or more photodetectors.

16. The system of claim 15, the wavelengths filtered exhibiting greater thermal fluorescence variation than wavelengths not filtered by the one or more spectral filters.

17. The system of claim 16, the wavelengths filtered exhibiting faster thermal fluorescence responses than wavelengths not filtered by the one or more spectral filters.

18. The system of claim 15, the wavelengths filtered exhibiting faster thermal fluorescence responses than wavelengths not filtered by the one or more spectral filters.

19. The system of claim 15, the laser system being a molecular fluorine laser system, and the wavelengths filtered by the one or more spectral filters include a red atomic fluorine emission.

20. An excimer or molecular fluorine laser system, comprising:

a laser tube containing a gas mixture at least including a halogen-containing species and a buffer gas, and including a heat exchanger and a gas circulation fan therein;

multiple electrodes within the laser tube connected to a pulsed electrical discharge circuit for energizing the gas mixture at a repetition rate greater than 1 kHz;

a resonator for generating a sub-250 nm output laser beam; and a substantially transmissive energy monitor window in the beam path of the output laser beam, wherein the resonator comprising an output coupler which seals the laser tube and output couples the output laser beam to be incident on the energy monitor window.

21. An excimer or molecular fluorine laser system, comprising:

a laser tube containing a gas mixture at least including a halogen-containing species and a buffer gas, and including a heat exchanger and a gas circulation fan therein;

multiple electrodes within the laser tube connected to a pulsed electrical discharge circuit for energizing the gas mixture at a repetition rate greater than 1 kHz;

a resonator for generating a sub-250 nm output laser beam;

a substantially transmissive energy monitor window in the beam path of the output laser beam; and at least one Brewster window sealing the laser tube, and a partially reflecting output coupler for output coupling the output laser beam to be incident on the energy monitor window.

* * * * *